US005778061A

United States Patent [19]
Parment et al.

[11] Patent Number: 5,778,061
[45] Date of Patent: Jul. 7, 1998

[54] SWITCHING DEVICE FOR A TELEPHONE SET WITH HANDSET, SWITCHING AN AUXILIARY DEVICE BY SUBSTITUTING FOR THE HANDSET

[75] Inventors: Philippe Parment, Versailles; Dominique Dubournais, Jouy le Moutier, both of France

[73] Assignee: Prescom, Saint Quentin En Yvelines, France

[21] Appl. No.: 649,704

[22] PCT Filed: Nov. 30, 1994

[86] PCT No.: PCT/FR94/01400

§ 371 Date: May 29, 1996

§ 102(e) Date: May 29, 1996

[87] PCT Pub. No.: WO95/15642

PCT Pub. Date: Jun. 8, 1995

[30] Foreign Application Priority Data

Dec. 1, 1993 [FR] France .................. 93 14383

[51] Int. Cl.$^6$ .................................................. H04M 1/00
[52] U.S. Cl. .................. 379/428; 379/420; 379/447; 379/448; 379/424
[58] Field of Search ............................ 379/428, 420, 379/447, 423, 424, 448, 430, 425

[56] References Cited

U.S. PATENT DOCUMENTS

| | | | |
|---|---|---|---|
| 2,082,130 | 6/1937 | Varley | 379/420 |
| 2,952,739 | 9/1960 | Lehman . | |
| 3,413,423 | 11/1968 | Sterko | 379/424 |
| 4,845,738 | 7/1989 | Takano . | |
| 4,907,267 | 3/1990 | Gutzmer . | |
| 4,930,156 | 5/1990 | Norris . | |
| 5,010,565 | 4/1991 | Nash et al. . | |

FOREIGN PATENT DOCUMENTS

| | | |
|---|---|---|
| 0 339 212 | 11/1989 | European Pat. Off. . |
| 544 855 | 10/1922 | France . |
| 41 06 479 | 9/1992 | Germany . |

*Primary Examiner*—Jack Chiang
*Attorney, Agent, or Firm*—Lowe, Price, LeBlanc & Becker

[57] ABSTRACT

The invention concerns a switching device for a telephone set having a handset enabling an auxiliary device to be substituted for the handset. In an embodiment, the switching device includes a casing provided with at least one compartment, the compartment being intended to receive one end of the handset. The compartment includes a switch actuated by the presence of the handset which triggers the aforementioned substitution. The invention finds application in hands-free telephoning and teleconferencing.

9 Claims, 2 Drawing Sheets

SWITCHING DEVICE FOR A TELEPHONE SET WITH HANDSET, SWITCHING AN AUXILIARY DEVICE BY SUBSTITUTING FOR THE HANDSET

BACKGROUND OF THE INVENTION

1. Field of the Invention

The present invention relates to a switching device for a telephone set having a handset, said device enabling an auxiliary device to be substituted for the handset.

The device of the invention finds many applications: so-called "hands free" telephony using a telephone set not designed for this purpose, connection to a teleconferencing system, connection to a system for hearing impaired persons, to a signal modulation and/or demodulation system, etc.

2. Description of the Prior Art

In a first category of known devices, the handset of a telephone is coupled to an auxiliary device. In this type of devices, an acoustic coupler is used into which the handset is inserted. In fact, an auxiliary device is not substituted for the handset, since the handset continues to fulfill its function: sound output function using the earpiece and sound pick-up function using the microphone, i.e. the transducers with which it is provided. The earpiece is coupled to a microphone in the acoustic coupler, and reciprocally, the acoustic coupler is provided with an electro-acoustic transducer coupled to the microphone of the handset. The conversion of the signals in both directions is therefore complex and their quality may suffer in consequence.

One device of this type is described in U.S. Pat. No. 4,845,738 (Katsuyuki Takamo), for example.

In a second category of known devices, an auxiliary device is really substituted for the handset of a telephone set, and a manual switch having two stable positions is used.

One example is described in U.S. Pat. No. 4,930,156. This embodiment is more particularly suitable for telephone sets in which the handset is connected to the main circuitry in the telephone set by a cord terminated by a plug-in connector. A casement is inserted between the telephone and the handset, connected to the main circuitry of the telephone set by a cord and a plug-in connector of the same type, the handset being connected to the casement. In the example described, the casement comprises various electronic interface circuits for transmitting and receiving signals and an earpiece-microphone assembly. A two-position manual switch substitutes the handset for said assembly and vice versa.

However, in the aforementioned example, after using the auxiliary device the user may, without thinking, replace the handset on its hook or in its cradle, the consequence of which is unintentionally to cut off the call in progress.

OBJECT OF THE INVENTION

The present invention has therefore as an object a switching device that is simple to use, on the one hand, and prevents all possibility of misoperation, on the other hand.

SUMMARY OF THE INVENTION

The present invention thus relates to a switching device for a telephone set having a handset, the switching device being used to connect an auxiliary device electrically to the telephone set by substituting it for said handset, the handset being connected to said switching device, the latter being connected to said telephone set in place of said handset, characterized in that it comprises a casing including means adapted to receive said handset when it is lifted off the telephone set; and in that said means are provided with a switching member having two switching states, the switching member detecting the presence of said handset to switch from a first switching state in which only the handset is in service to a second switching state in which only said auxiliary device is in service.

In one particular embodiment, a casing may be provided comprising two compartments for respectively receiving the ends of the handset corresponding to the earpiece and to the microphone. The exact shape of the casing and of said compartments are naturally imposed by the configuration of the handset.

A switching member with galvanic contacts is placed in the bottom of these compartments, for example. The mere fact of placing the handset on this casing actuates the switching member. As a result the handset is set out of service and, at the same time, an auxiliary device is substituted for it.

In another embodiment a casing is provided having a single receptacle adapted to receive one end of the handset. As previously, this receptacle is provided with a switching member sensing the presence of the handset.

In a different embodiment, instead of placing the handset on a casing, a fork, hook or cradle type receptacle may be used. As previously, the weight of the handset causes this receptacle to actuate a switching member that triggers the substitution.

In a further embodiment it is the part, linking the two ends of the handset, that actuates a switching member which triggers the substitution, due to the weight of the handset.

Finally, in particular embodiments, other technologies may be employed instead of a switching member with galvanic contacts: electro-optical switch, capacitive switch, magnetic switch, etc.

Thus the present invention consists in the fact that placing the telephone handset on/in the receptacle of an auxiliary switching device other than that of the telephone actuates unambiguous switching from the handset to an auxiliary device.

In other words, the present invention consists in that, the call having been set up, substitution of an auxiliary device for the handset is brought about by a switching member controlled by the presence of the telephone handset in the receptacle of the switching device connected electrically to the telephone set.

The invention therefore achieves the stated objectives. The fact of placing the handset on or in a receptacle, or hanging it from an appropriate member, provides simple and unambiguous switching as required to substitute an auxiliary device for the handset.

What is more, the "physical" circuits required for this switching are simple to implement. In particular, for telephone sets of recent design, it is sufficient to disconnect the handset and to plug it into a suitable connector on said casing and to connect the latter in place of the handset connector. In a similar way, an additional appropriate connector may be provided on the casing for connecting the auxiliary device.

The converse operations return to the original situation in just as simple a manner.

BRIEF DESCRIPTION OF THE DRAWINGS

The invention will be more clear and other features and advantages will be apparent from the reading of the following description with reference to the accompanying figures, in which.

DESCRIPTION OF THE PREFERRED EMBODIMENTS

Figure 1:
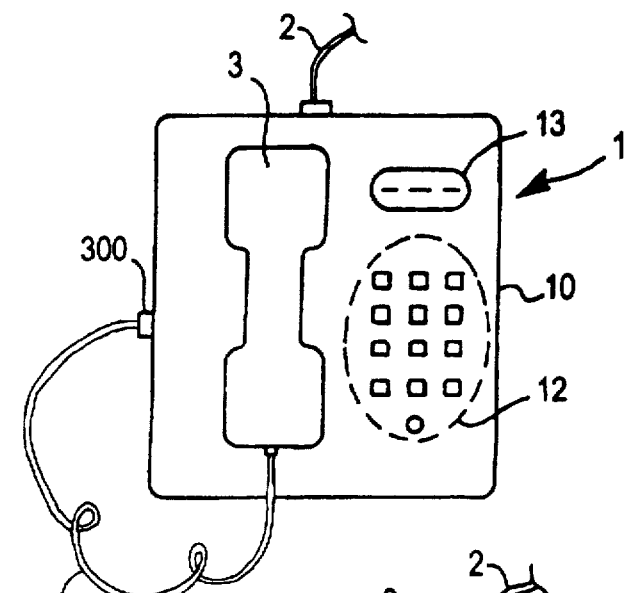
FIG. 1 schematically illustrates a telephone set having a handset.

FIG. 1 illustrates a telephone set 1 fitted with a handset 3 and connected to a public or private telephone network (not shown) by an appropriate cable 2. To affix the idea, it will be assumed that the telephone set is of the pushbutton type, but this is not limiting on the invention. Casing 10 therefore has an area of keys 12, which may incorporate indicator lamps (light-emitting diodes, for example). In the example shown the telephone set 1 also has a display screen 13, which is usually of the liquid crystal type. The handset is connected to the main circuitry (not shown) of the telephone set 1 by a cable 30. In telephone sets of recent design the cable 30 is usually connected by means of a plug-in connector 300. Particularly, this facilitates changing the handset 3 if the latter is faulty.

The connector is usually of the type known as a "modular jack". It is also covered by ISO Standard 8867. This type of connector is identified by various codes, such as RJxx where xx represents the exact type, depending on the number of contacts, for example (xx can take values such as 12, 45, etc).

In what follows, similar or identical parts are identified by the same reference numbers in all the figures and are described again only as and when necessary.

Figure 2:
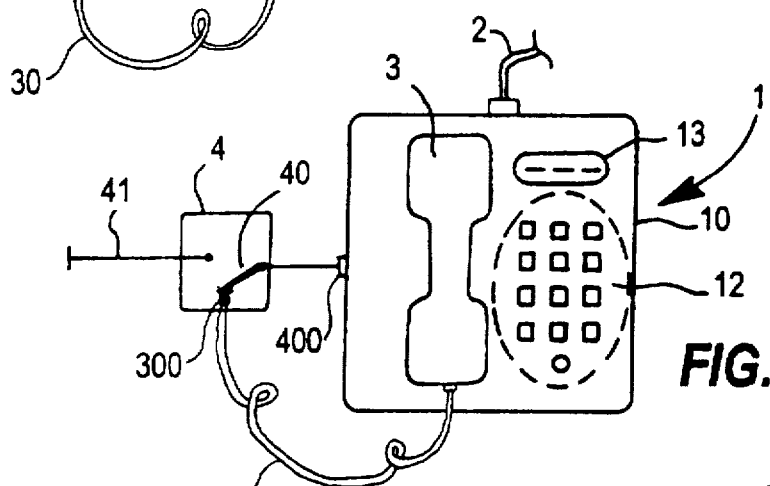
FIG. 2 illustrates a switching device associated with a prior art telephone.

FIG. 2 illustrates a switching device 4 of the prior art. An auxiliary device (not shown) is substituted for the handset 3 according to the state of a manual switch 40 with two stable positions. The switch is disposed in a casement 4 making a selective connection between the cable 30 and a cable 41 connected to the auxiliary device, on the one hand, and to the telephone set 1, on the other hand. The switching device 4 is connected to the casing 10 of the telephone set 1 by a cable 40 fitted with a connector 400 that plugs in in place of the connector 300 fitted to the cable 30. The latter is plugged into a like connector on the casement 4.

This arrangement is similar to that described in the U.S. Pat. No. 4,930,156 previously mentioned.

It has the drawbacks already referred to.

Figure 3:
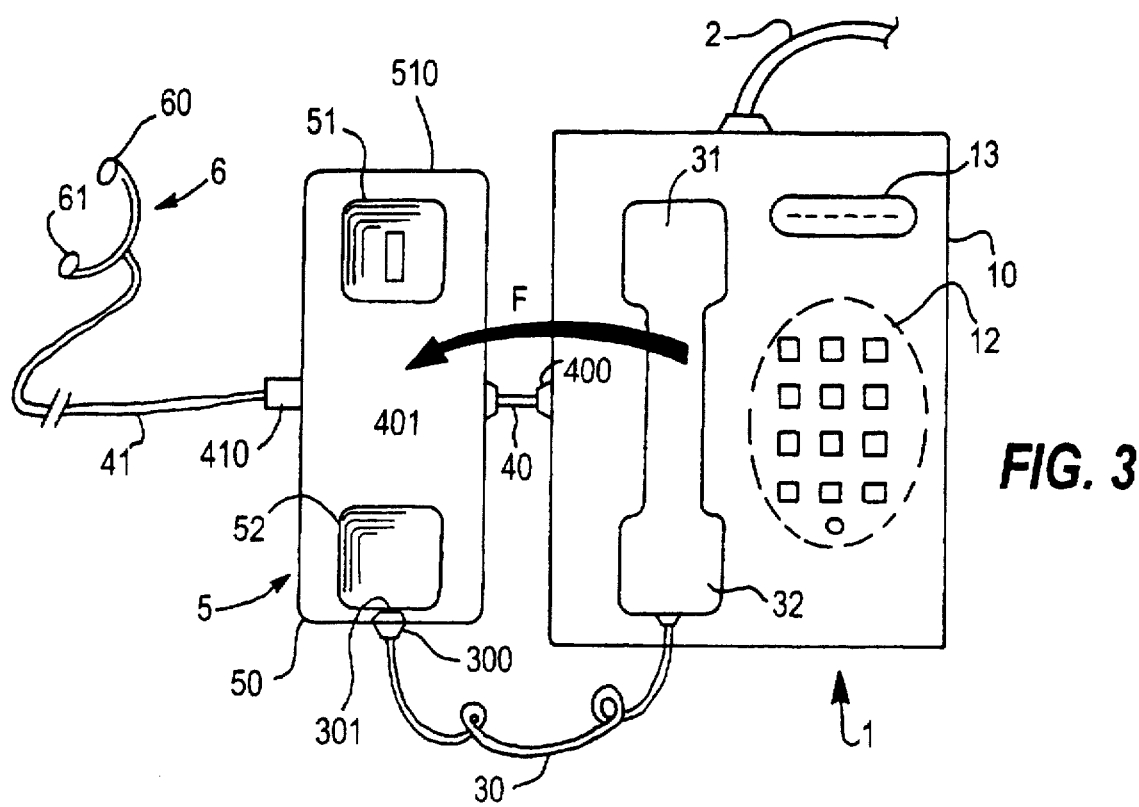
FIG. 3 schematically illustrates one embodiment of a switching device of the invention.

FIG. 3 schematically illustrates one embodiment of a switching device 5 of the invention.

It comprises a casing 50 with two receptacles or compartments 51 and 52 respectively designed to receive the "earpiece" end 31 and the "microphone" end 32 of the handset 3.

The latter normally rests in the housing provided for this purpose in the casing 10. To substitute for the handset 3 an auxiliary device 6, for example a headset having an earpiece 60 and a microphone 61, as shown in the figure, the handset 3 is placed on the casing 50 of the switching device 5. To be more precise, as mentioned above, the earpiece end 31 and the microphone end 32 of the handset 3 are inserted in their respective receptacles 51 and 52 (as symbolized by the arrow F).

In the example shown, the receptacle 51 has, on its bottom, for example, a switching member 510 with galvanic contacts having two stable switching states. The switching member 510 is actuated by the weight or more generally the presence of the handset 3. This brings about the required switching. The handset 3 is out of service and, at the same time, the auxiliary device 6 is substituted for it. The operation of the switching member 510 is explained below with reference to FIGS. 4 and 5.

If the type of telephone allows it, i.e., if the cord 30 is fitted with a plug-in connector 300, the latter is advantageously disconnected from the casing 10 of the telephone set 1. The casing 50 of the switching device 5 is provided with a female connector 301 adapted to receive the connector 300. Similarly, the casing 50 of the switching device 5 is connected instead of and in place of the handset by means of a cord 40 fitted with connectors 400 (at the telephone set 1 end) and 401 (at the switching casing 50 end). Finally, the auxiliary device 6 can be connected to the casing 50 of the switching device 5 by means of the cord 41 fitted with a connector 410.

This advantageous arrangement enables various types of auxiliary devices to be connected to the same casing 50 of the switching device 5 merely by disconnecting the connector 410 and connecting another auxiliary device. It is equally feasible, in a different embodiment that is not shown, to connect plural auxiliary devices in parallel.

It is equally simple to set out of service the casing 50 of the switching device 5 by disconnecting the cord 40 (at the connector 400) and connecting in its place to the casing 10 the cord 30 (at the connector 300), to reconnect the handset 3 permanently.

The switching member 510 can naturally be located in the receptacle 52 instead of in the receptacle 51. Likewise, it could equally well be disposed on the side walls of these receptacles or on the top face of the casing 50 of the switching device 5 if the shape of the handset lends itself to this.

Nevertheless, locating the switching member 510 in the bottom of one of the receptacles 51 or 52 is probably preferable since it does not require any accurate location of the handset 3. If the dimensions of the switching member 510 are sufficiently large, and even if the dimensions and shapes of the receptacles 51 and 52 are not closely correlated with those of the handset 3, the required switching is achieved without special precautions.

This can additionally be exploited to produce a casing that, if not universal, is at least suitable for many different types of telephone sets. All that is required is to adopt relatively large dimensions for the receptacles 51 and 52 and to adjust the distance between them accordingly, allowing for the telephone sets in most widespread use.

The casing 50 of the switching device 5 can be simplified. Only one receptacle is needed to accommodate one of the ends of the handset 3, preferably the earpiece end since the microphone end is usually that at which the connecting cord 30 terminates and in some configurations this could impede placing the handset 3 on the casing 50 of the switching device 5.

Figure 4:
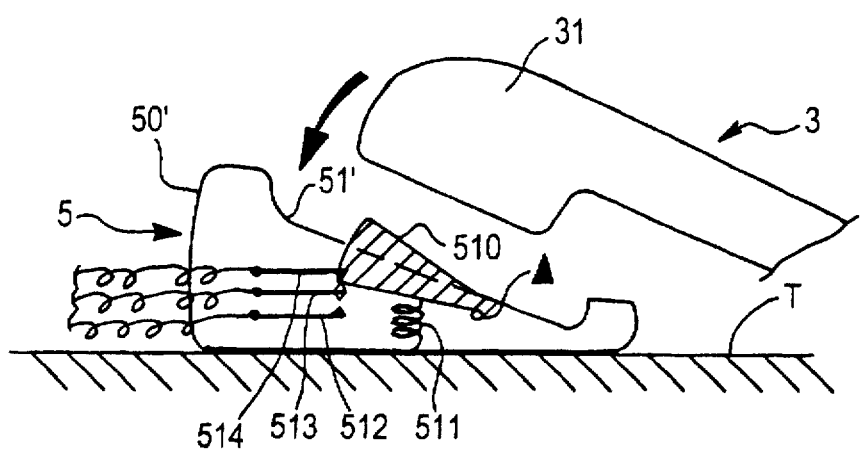
FIGS. 4 and 5 illustrate in more detail the operation of one particular embodiment of a switching device of the invention.
Figure 5:
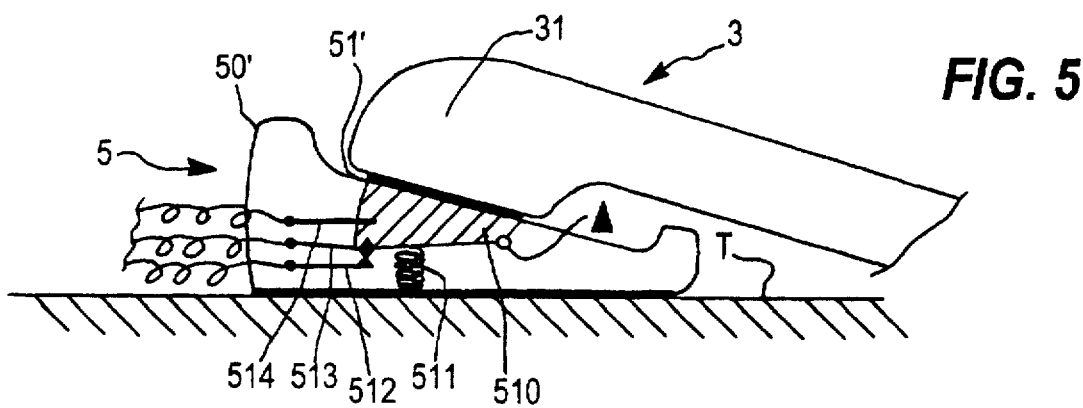

An embodiment of this type is shown in FIGS. 4 and 5. The casing 50' comprises a single compartment 51' the bottom of which is advantageously inclined to the plane on which the casing rests, for example the substantially horizontal top of a table T.

The switching member 510, disposed on the bottom of the compartment 51' in the example shown, is mobile about a substantially horizontal axis A.

A return spring system 511 or any other appropriate system holds it in a raised position. When the earpiece part 31 of the handset 3 is not inserted into the compartment 51' (FIG. 4), a set of intermediate contacts 513 with a first set of contacts 514 closes electrical circuits.

On the other hand, when the weight or more generally the presence of the handset 3 causes the switching member 510 to pivot about its axis Δ and compress the spring 511 (FIG. 5), the set of intermediate contacts with a second set of contacts 512 closes electrical circuits.

This automatically and reliably substitutes the auxiliary device 6 (FIG. 3) for the handset 3.

The exact number of contacts in each set 512 through 514 and the exact configuration of the electrical connections to be made can naturally depend on the type of telephone set 1 used and, possibly, on standards applicable in the country in which the device is used.

These are merely technology choices that will be obvious to the person skilled in the art.

Lifting off the handset 3 reverts to the initial conditions (FIG. 4), the spring 511 expanding and the handset 3 is again connected to the telephone set 1, without any risk of unwanted interruption of the telephone call in progress.

Figure 6:
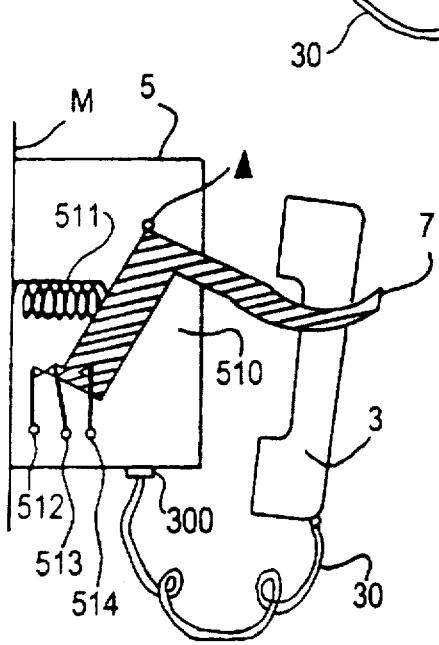
FIGS. 6 and 7 illustrate further embodiments of switching devices of the invention.

In a further embodiment shown in FIG. 6 the casing 50 of the switching device 5 can be fixed to a wall M or more generally to a substantially vertical panel. In this case the receptacle may comprise a fork 7 or a similar member designed to suspend the handset 3. The fork 7 rotates about a horizontal axis Δ and operates the switching member 510 proper.

When the handset 3 is not hung on the fork 7, the latter is pushed back by a return spring means 511 of the switching member 510, for example a spring. When the handset 3 is hooked on, it causes the fork 7 to pivot about its axis and this compresses the spring 511.

As before, through the switching member 510 the fork 7 operates on sets of contacts 512 through 514 which triggers the substitution of the auxiliary device (6, FIG. 3) for the handset 3 when the latter is hung on the fork 7.

Furthermore, as already mentioned, the switching means can use technologies other than that based on a galvanic contact. Opto-electronic, capacitive or magnetic presence detectors may be used.

Figure 7:
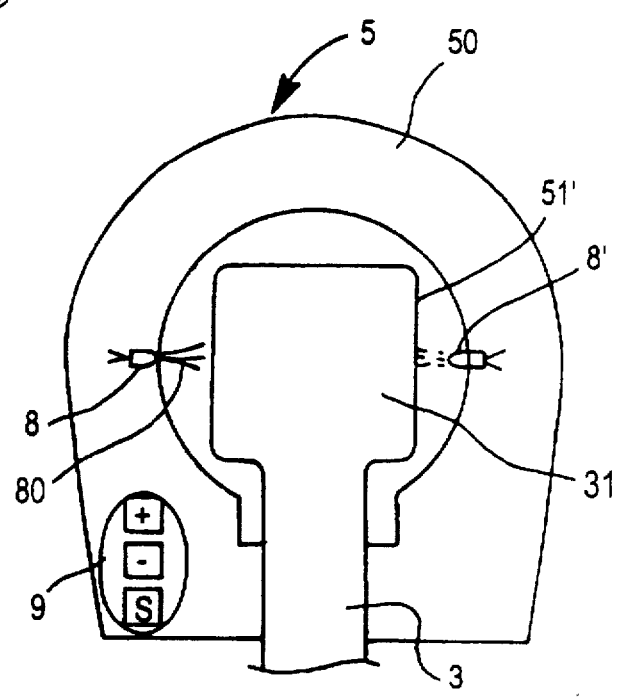

FIG. 7 shows one example of an electro-optical sensor comprising a light source 8 and a photodetector 8'.

The casing 50 of the switching device 5 is of similar type to that described with reference to FIGS. 4 and 5, i.e., provided with a single compartment 51' designed to receive the earpiece part 31 (for example) of the handset 3.

In the example shown the light source 8 and the photodetector 8' are disposed on the lateral walls of the compartment 51'. The light source 8 emits a beam 80 detected by the photodetector 8'. When the earpiece part 31 of the handset is placed in the compartment. 51', it interrupts the emitted light beam 80.

This effect is used to detect the presence of the handset 3. Appropriate electronic circuits receiving the output signal of the photodetector 8' command the required switching, i.e., effective substitution of the auxiliary device (6, FIG. 3) for the handset 3 and disconnecting the latter.

However, sensors other than galvanic sensors, as in the example just illustrated, have the drawback of requiring the presence in the casing 50 of the switching device 5 of a source of electrical power (or at least some provision for the supply of power) and the aforementioned electronic circuits.

The casing 50 of the switching device 5 may additionally incorporate auxiliary functions of the auxiliary device (6, FIG. 3). In FIG. 7 these functions are symbolically represented by the generic reference number 9. This might be a volume control "+" and "−", if the casing incorporates an audio amplifier, a "secrecy" button "S", particularly useful for "hands-free" telephony, etc.

The casing 50 of the switching device 5 may also incorporate not only auxiliary functions but also all or part of the auxiliary device.

It goes without saying that these complementary aspects of the invention are compatible with any of the embodiments described with reference to FIGS. 3 through 6.

The invention is naturally not limited to only those embodiments specifically described with particular reference to FIGS. 3 through 7.

As already mentioned, the shapes and configurations of the casing 50 of the switching device 5 can be varied in many ways without departing from the scope of the invention. These parameters depend in particular on the type of telephone set 1 associated with the switching device.

The auxiliary device 6 from FIG. 3 can also be of various types: headset or similar unit incorporating an earpiece and a microphone, as illustrated in FIG. 3, and enabling hands-free telephony ; teleconference device with sound signal output means (loudspeaker or electro-acoustic transducer) and sound signal pick-up means (microphones), additional telephone set, etc. As suggested by the embodiment shown in FIG. 7, all or part of the electronics associated with said auxiliary device may also be incorporated: tone control, remote control, etc.

Moreover, in the embodiment shown in FIG. 3, the compartment(s) made on the casing 50 of the switching device 5 could be replaced by a projecting part designed to nest in the cavity usually provided in the earpiece of the handset.

What we claim is:

1. A switching device for connecting an auxiliary device to a telephone set having a handset, said auxiliary device thereby replacing said handset which is disconnectable from the telephone set, the telephone set having a housing, the switching device having a casing said switching device comprising first connecting means for electrically connecting said telephone set to said switching device, second connecting means for electrically connecting said handset to said switching device, third connecting means for electrically connecting said auxiliary device to said switching device, and the switching device casing being entirely separate from the telephone set housing, the switching device casing including switching means having two switching states for mechanically receiving said handset when said handset is lifted off said telephone set housing, said switching means electrically switching from a first switching state in which only the handset is electrically connected to said telephone set through said first connecting means and second connecting means, to a second switching state in which only said auxiliary device is electrically connected to said telephone set through said first connecting means and third connecting means in response to mechanical placement of said handset on said casing of said switching device.

2. The device according to claim 1, wherein when said casing is adapted to be placed on a substantially horizontal plane, said casing including at least one compartment for receiving one of the ends of the handset, said switching means being arranged to be at least partially lodged in said compartment so as to detect the presence of said end of the handset therein and to electrically switch from said first switching state to said second switching state.

3. The device according to claim 1, wherein when said casing is adapted to be placed in a substantially vertical plane, said device including an element acting on said switching means when the handset is hooked onto the element to bring about the switching between said two switching states.

4. The device according to claim 1 wherein said switching means comprises galvanic contacts.

5. The device according to claim 1 wherein said switching means is electro-optical.

6. The device according to claim 5, wherein said electro-optic switching means comprises a light source and a photodetector, a light beam emitted by said light source being detected by said photodetector to bring about the switching between said two switching states in response to the placement of said handset on said casing of said switching device.

7. The device according to claim 1 wherein said casing includes electronic circuits for controlling said auxiliary device.

8. The device according to claim 7, wherein said electronic circuits are associated with hands-free telephony functions.

9. The device according to claim 1 wherein said auxiliary device includes signal modulation and/or demodulation means.

* * * * *